United States Patent
Hasegawa et al.

(10) Patent No.: US 10,097,723 B2
(45) Date of Patent: Oct. 9, 2018

(54) APPARATUS FOR CONTROLLING PAGE TURNING, METHOD FOR SAME AND STORAGE MEDIUM

(71) Applicant: CASIO COMPUTER CO., LTD., Shibuya-ku, Tokyo (JP)

(72) Inventors: Hirokazu Hasegawa, Koganei (JP); Naoaki Misaki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/166,214

(22) Filed: May 26, 2016

(65) Prior Publication Data
US 2017/0066274 A1 Mar. 9, 2017

(30) Foreign Application Priority Data
Sep. 3, 2015 (JP) ................. 2015-174080

(51) Int. Cl.
*H04N 1/04* (2006.01)
*H04N 1/195* (2006.01)
*B42D 9/06* (2006.01)

(52) U.S. Cl.
CPC ........... *H04N 1/19594* (2013.01); *B42D 9/06* (2013.01); *H04N 2201/0098* (2013.01); *H04N 2201/0434* (2013.01)

(58) Field of Classification Search
CPC ....... H04N 1/19594; H04N 2201/0434; H04N 2201/0098

USPC ......................................... 358/474, 498, 497
See application file for complete search history.

(56) References Cited

U.S. PATENT DOCUMENTS

| | | | |
|---|---|---|---|
| 5,390,033 A * | 2/1995 | Bannai | G03G 15/60 358/400 |
| 9,056,516 B2 | 6/2015 | Hasegawa | |
| 2004/0027547 A1* | 2/2004 | Stemmle | G03B 27/32 355/25 |
| 2014/0375802 A1* | 12/2014 | Hasegawa | G06K 9/2054 348/143 |
| 2015/0239277 A1 | 8/2015 | Hasegawa | |

FOREIGN PATENT DOCUMENTS

| | | |
|---|---|---|
| JP | 2014061619 A | 4/2014 |
| JP | 2015006754 A | 1/2015 |

* cited by examiner

*Primary Examiner* — Houshang Safaipour
(74) *Attorney, Agent, or Firm* — Holtz, Holtz & Volek PC

(57) ABSTRACT

The book page turning operation of an automatic page turning apparatus is controlled by a tablet. Every time the automatic page turning apparatus completes a page turning operation, the tablet photographs the page and stores its image. During this processing, the tablet stops the series of page turning operations of the automatic page turning apparatus every time a sequential page-turning count m reaches a preset interruption page count M. Then, the tablet restarts the series of page turning operations in response to a photographing restart instruction from the user. As a result of this configuration, the user is freed from an operation of stopping a page turning operation during image photographing.

17 Claims, 7 Drawing Sheets

FIG. 3

| OPERATION STAGE | OPERATION CONTENTS | OPERATIONN PROCESS |
|---|---|---|
| 1 | PHOTOGRAPHING (FRONT COVER) | PHOTOGRAPH-ING |
| 2 | PHOTOGRAPHING (END PAPER ON FRONT COVER SIDE) | |
| 3 | PHOTOGRAPHING (LEFT PAGES) | |
| 4 | PHOTOGRAPHING (RIGHT PAGES) | |
| 5 | PHOTOGRAPHING (BACK COVER) | |
| 6 | PHOTOGRAPHING (END PAPER ON BACK COVER SIDE) | |
| 7 | PAGE EDITING | EDITING |
| 8 | TRIMMING | |
| 9 | COLOR CORRECTION | |
| 10 | GENERATING (SETTING) | GENERATING |
| 11 | GENERATING (FILE GENERATION) | |
| 12 | TRANSFERRING | TRANSFERRING |

APPARATUS FOR CONTROLLING PAGE TURNING, METHOD FOR SAME AND STORAGE MEDIUM

CROSS-REFERENCE TO RELATED APPLICATION

This application is based upon and claims the benefit of priority from the prior Japanese Patent Application No. 2015-174080, filed Sep. 3, 2015, the entire contents of which are incorporated herein by reference.

BACKGROUND OF THE INVENTION

1. Field of the Invention

The present invention relates to a technique of controlling the operation of a page turning apparatus which mechanically turns a page serving as an imaging target.

2. Description of the Related Art

Conventionally, as a page turning apparatus which mechanically turns a page serving as an imaging target, an automatic page turning apparatus is known which includes a turning mechanism that turns each page of an opened book from a page-turning start point (one side of an opened page) to a page-turning end point (the other side of the opened page) by a tip end portion of a rotatable arm. When turning pages, this automatic page turning apparatus can efficiently acquire a series of page images by automatically photographing a page at each page-turning start point in conjunction with a page turning operation.

When pages are being turned over mechanically (imaging target pages are being sequentially turned over), the state of previously turned pages becomes unstable as the number of turned pages increases. For this reason, every time a certain number of pages are turned during the image photographing of pages, the user is required to hold a plurality of pages on the page-turning end point side with his/her hand or make the pages stable by using a holding tool such as a clip. Accordingly, during the image photographing of a series of pages, the user is required to stop a page turning operation at suitable timing while checking a page state on the page-turning end point side, which makes the imaging operation cumbersome.

SUMMARY OF THE INVENTION

The present invention has been conceived in light of the above-described problems. An object of the present invention is to improve workability when capturing a series of pages in conjunction with page turning operations for imaging target pages by a page turning apparatus.

In accordance with one aspect of the present invention, there is provided an apparatus for controlling page turning, comprising: an interruption section which interrupts a series of page turning operations of a page turning apparatus that mechanically turns a page serving as an imaging target, every time predetermined interruption timing is reached; and a restarting section which restarts the series of page turning operations of the page turning apparatus interrupted by the interruption section, at predetermined restart timing.

In accordance with another aspect of the present invention, there is provided a method for controlling page turning, comprising: interrupting a series of page turning operations of a page turning apparatus that mechanically turns a page serving as an imaging target, every time predetermined interruption timing is reached; and restarting the series of page turning operations interrupted in the page turning apparatus, at predetermined restart timing.

In accordance with another aspect of the present invention, there is provided a non-transitory computer-readable storage medium having a program stored thereon that is executable by a computer to actualize functions comprising: interrupting a series of page turning operations of a page turning apparatus that mechanically turns a page serving as an imaging target, every time predetermined interruption timing is reached; and restarting the series of page turning operations interrupted in the page turning apparatus, at predetermined restart timing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 3 is a diagram showing the contents of a book file generation operation;

DETAILED DESCRIPTION OF THE PREFERRED EMBODIMENT

An embodiment of the present invention will hereinafter be described below with reference to the accompanying drawings.

Figure 1:
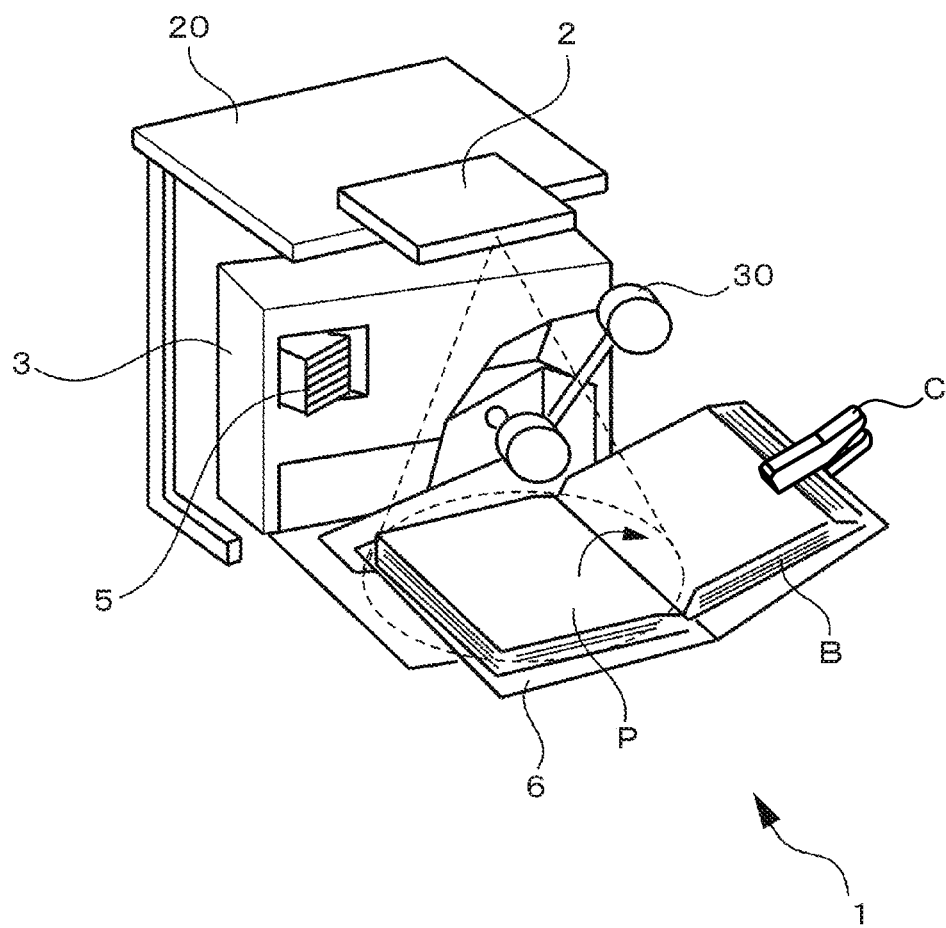
FIG. 1 is a perspective view showing the schematic structure of a document camera system according to an embodiment of the present invention.

FIG. 1 is a perspective view showing the schematic structure of a document camera system 1 according to an embodiment of the present invention. The document camera system 1 includes a tablet 2 and an automatic page turning apparatus 3.

The automatic page turning apparatus 3 is an example of a page turning apparatus according to the present invention, and includes a holding table 6 which holds an opened book B or the like, a turning mechanism 30 which holds a page P of the book B or the like on the holding table 6 at a page-turning start point and releases the page P at a page-turning end point, and an air blowing section 5 for preventing the page P from returning to the page-turning start point by blowing air toward the page P at the page-turning end point from above the page-turning start point.

The tablet 2, which is a portable information processing terminal including a camera (an imaging section to be described later), is placed above the book B or the like (e.g., book or magazine) by using a stand 20, and photographs a page-turning start portion of a page P of the book B. Note that the tablet 2 and the automatic page turning apparatus 3 can communicate with each other via near field communication adapters respectively incorporated therein, such as Bluetooth (registered trademark) or Wi-Fi (registered trademark).

The document camera system 1 turns pages P of the book B or the like (e.g., book or magazine) separately one by one by the automatic page turning apparatus 3 while photographing each page by the tablet 2 and acquiring electronic data, and records electronic data corresponding to a plurality of pages as a file (hereinafter referred to as "book file") in a predetermined format.

Figure 2:
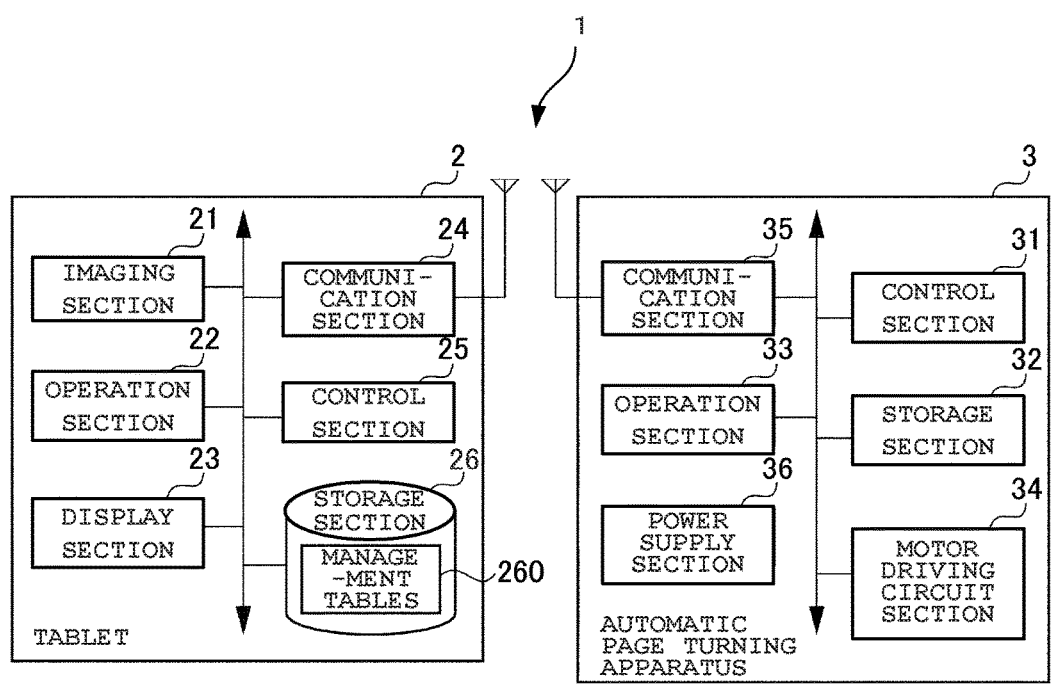
FIG. 2 is a block diagram showing the main portion of the electrical arrangement of the document camera system.

FIG. 2 is a block diagram showing the main portions of the electrical structures of the tablet 2 and the automatic page turning apparatus 3. Here, the electrical structure of the automatic page turning apparatus 3 is described first.

The automatic page turning apparatus 3 mainly includes a control section 31, a storage section 32, an operation section 33, a motor driving circuit section 34, a communication section 35, and a power supply section 36. The storage section 32 includes a ROM (Read Only Memory) recording various types of programs and a RAM (Random Access Memory) in which these programs are loaded.

The operation section 33 includes various types of switches such as a start switch for starting page turning processing and a stop switch for stopping page turning processing. The motor driving circuit section 34 includes a motor which drives the turning mechanism 30, a motor which drives a fan provided for the air blowing section 5, and a motor driver which drives the motors.

The control section 31 drives the turning mechanism 30 to turn pages P of the book B or the like separately one by one by controlling the motor driving circuit section 34 in cooperation with the tablet 2 from when the moment the start switch is operated until when the stop switch is operated. The communication section 35 is a communication interface for communication with the tablet 2, and connects the automatic page turning apparatus 3 thereto based on a communication method such as Bluetooth (registered trademark) or Wi-Fi (registered trademark). The power supply section 36 supplies power to the respective blocks 31 to 35.

As will be described later, when being connected to the tablet 2 via communication, the automatic page turning apparatus 3 repeats a series of page turning operations of turning pages P of the book B or the like separately one by one by receiving page-turning start signals instructing to start page turning from the tablet 2.

Next, the electrical structure of the tablet 2 is described. The tablet 2 mainly includes an imaging section 21, an operation section 22, a display section 23, a communication section 24, a control section 25, and a storage section 26.

The imaging section 21, which is a camera that can capture images of pages of the book B or the like, includes an image sensor constituted by a CCD (Charge Coupled Device), CMOS (Complementary Metal Oxide Semiconductor), or the like in addition to an optical system including a lens. A light image that has entered through the lens is photoelectrically converted into an analog image signal, subjected to color separation and gain adjustment for each color component, and then converted into digital data. Note that the lens and the image sensor are provided on the rear surface side of the tablet 2, which is not shown in FIG. 1.

The display section 23 includes a display monitor such as an LCD (Liquid Crystal Display) or organic EL (Electro Luminescence) and displays page images captured by the imaging section 21, various types of information, and the like on the screen of the display monitor.

The operation section 22 includes a minimum number of operation switches such as a power key (not shown) and a touch panel integrally provided on the surface of the display monitor of the display section 23 and constituting the surface of the tablet 2. This operation section 22 supplies operation information, which the user provides on the tablet 2, to the control section 25.

The communication section 24 is a communication interface for communication with the automatic page turning apparatus 3 and connects the tablet 2 thereto based on a communication method such as Bluetooth (registered trademark) or Wi-Fi (registered trademark).

The control section 25 includes a CPU (Central Processing Unit), its peripheral circuits and the like, and a RAM (Random Access Memory), and controls each section of the tablet 2. Note that the CPU may be a processor or the like.

In the storage section 26, for example, a semiconductor memory is mounted, and various types of application programs, various types of data generated in the process of executing programs by the control section 25, and the like are stored. The above application programs include a book management program for photographing each page of a book or the like by the automatic page turning apparatus 3, storing page images acquired by the image photographing in the storage section 26 as book files, and browsing and editing the stored book files.

In addition, the storage section 26 stores a series of page images including photographed images acquired by photographing the respective pages of a book or the like and photographed images acquired by photographing the front cover, end paper (on the back cover side), back cover, and end paper (on the front cover side) of the book during the generation of a book file. Note that, in the following descriptions, books and the like to be converted into electronic data will be simply referred to as "books" for convenience of explanation.

Also, the storage section 26 has a secured area for storing a plurality of management tables 260 for managing book files and a series of page images for each book. In particular, the management tables 260 each store information indicating a correspondence relationship between each page image of a series of page images before being integrated into a book file and each page of the book and basic information such as the title and the number of pages of each book and the data amount of page images for each book.

When a book is to be converted into electronic data and stored as a book file by the document camera system 1, the respective pages of the book are sequentially photographed to acquire page images with the tablet 2 being placed above the automatic page turning apparatus 3 as shown in FIG. 1 and the page turning operation of the automatic page turning apparatus 3 being wirelessly controlled by the tablet 2. In addition, the front cover and the like of the book are photographed to acquire photographed images thereof.

Subsequently, various types of editing operations are performed for the acquired series of page images (including photographed images of the front cover and the like) by using the tablet 2, and the series of page images are integrated into a single file, whereby a book file is generated. This operation will be specifically described below.

FIG. 3 is a diagram showing details of a file generation operation for an arbitrarily book. This file generation operation is roughly divided into four operation processes, namely, a photographing process, an editing process, a generating process, and a transfer process.

The photographing process includes six photographing operation stages, which are photographing operation stages for a front cover, an end paper (on the back cover side), left pages, right pages, a back cover, and an end paper (on the front cover side). In the photographing operations for left and right pages, a series of page turning operations is performed by the automatic page turning apparatus 3, and only left and right pages are sequentially and automatically photographed during the series of operations. In the automatic photographing, collective photographing and divisional photographing can be performed. When the collective photographing is performed, a series of page images of the left or right pages are managed in association with each other as a group of single images. When the divisional photographing is performed, a series of page images of the left or right pages are managed in association with each other as a plurality of groups of images.

The editing process includes three operation stages for page editing, trimming, and color correction. The page editing is an operation of replacing an arbitrary page image and inserting an individually photographed page, and the trimming is an operation of individually or collectively trimming a desired area from each of a series of page images. The color correction is an operation of individually or collectively performing color correction including brightness adjustment and contrast adjustment for each of a series of page images. The generating process includes two operation stages including a setting operation for determining the data size or quality (image quality) of a book file and a file generation operation for integrating a series of page images into a single file.

Next, the operations of the tablet 2 and the automatic page turning apparatus 3 when only left and right pages are being sequentially and automatically photographed by the tablet 2 with the tablet 2 and the automatic page turning apparatus 3 being wirelessly connected to each other are described with reference to FIG. 4 to FIG. 7.

The tablet 2 is provided with a collective photographing mode and a divisional photographing mode as automatic photographing modes that can be used when only left or right pages are sequentially and automatically photographed. The collective photographing mode is a mode of simply collectively photographing a series of pages in synchronization with the page turning operation of the automatic page turning apparatus 3. The divisional photographing mode is a mode of divisionally photographing a series of pages. When the divisional photographing mode is set in the tablet 2, the control section 25 executes processing shown in FIG. 4 and FIG. 5 in accordance with the book management program.

Figure 4:
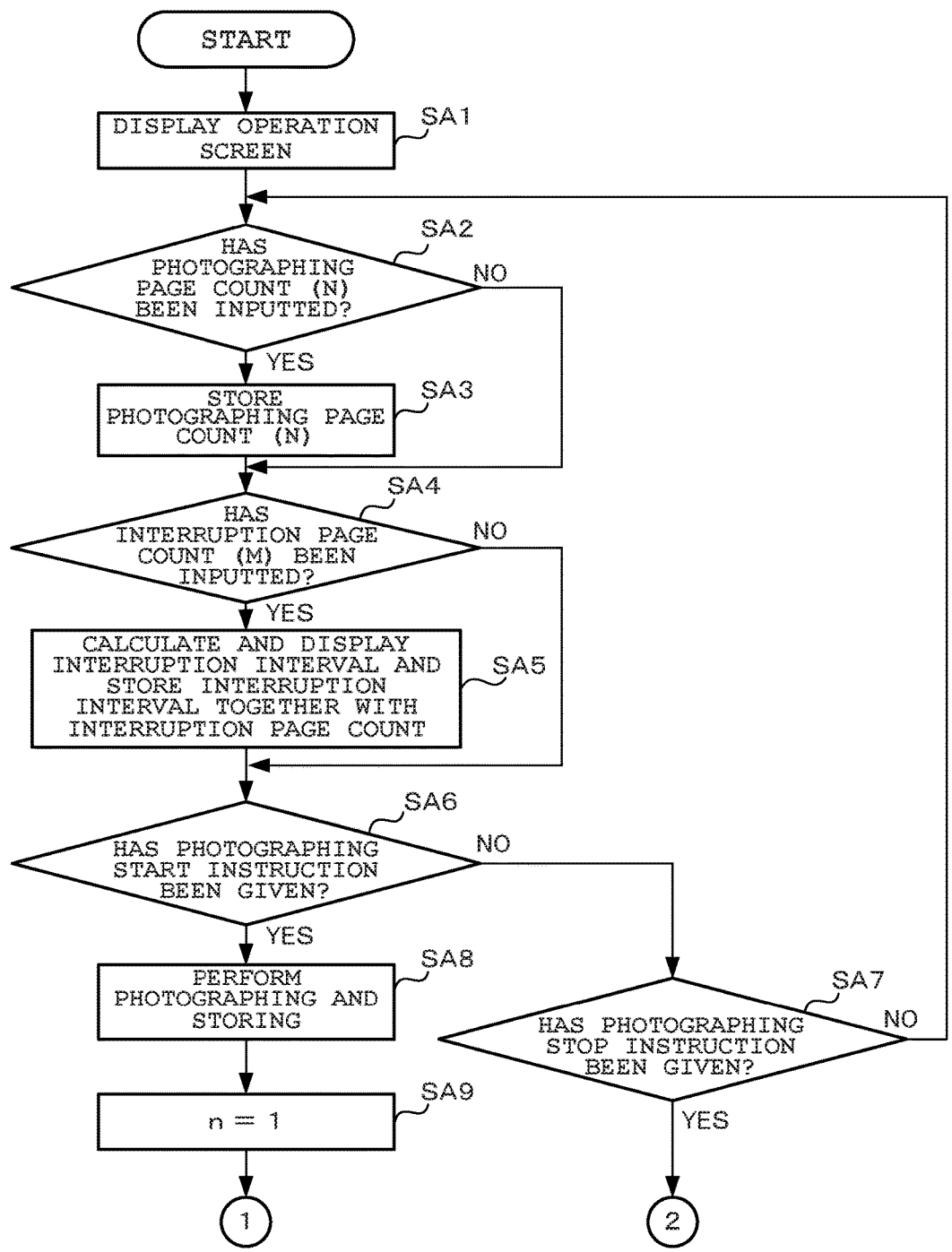
FIG. 4 is a flowchart for explaining the operation of a tablet.
Figure 7:
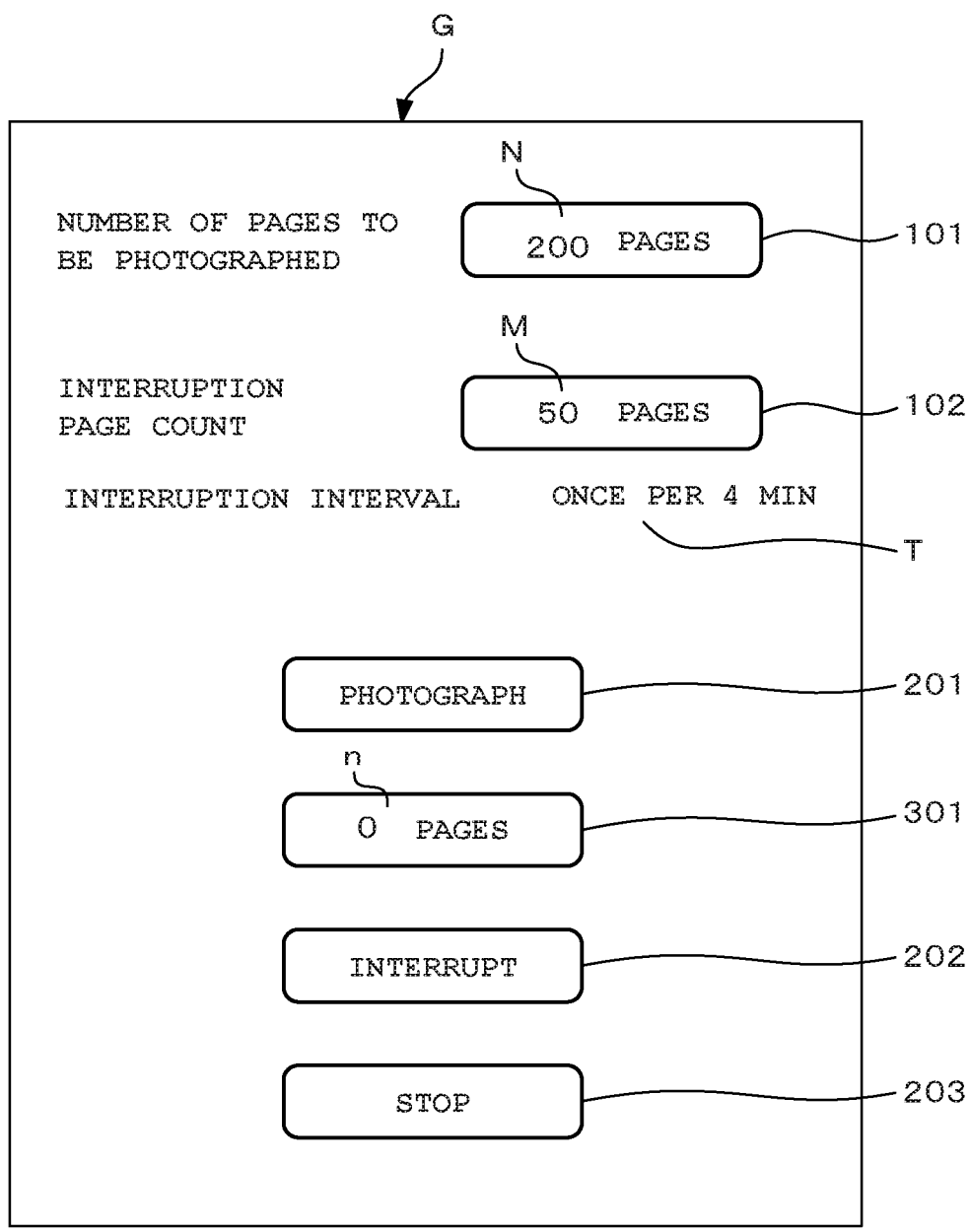
FIG. 7 is an operation screen in automatic photographing.

As shown in FIG. 4, when the divisional photographing mode is set, the control section 25 displays an operation screen G shown in FIG. 7 on the display screen of the display section 23 (Step SA1). The operation screen G is provided with a first input box 101 for inputting a photographing page count N, a second input box 102 for inputting an interruption page count M, a photographing start button 201, a photographing interruption button 202, a photographing stop button 203, and a display box 301 for displaying a photographing-completed page count n.

The photographing page count N is the total number of left or right pages to be photographed by the user. When the photographing page count N is inputted to the first input box 101 (YES at Step SA2), the control section 25 causes it to be temporarily stored (Step SA3).

The interruption page count M is the number of pages at which a series of photographing operations is interrupted, and is the number of times of page turning operations of the automatic page turning apparatus 3. Note that, when displaying the operation screen G in Step SA1, the control section 25 displays, on the operation screen G, a specified value in the second input box 102 or a changed value of a specified value in the previous use of the divisional photographing mode, and an interruption interval T corresponding to the changed value.

When a new interruption page count M is inputted to the second input box 102 (YES at Step SA4), the control section 25 calculates a corresponding interruption interval (time), and stores the new interruption page count M and the interruption interval T in the storage section 26 while displaying the calculation result T on the operation screen G ("4 min" in FIG. 7) (Step SA5). Note that the interruption interval T is calculated by multiplying the time required for turning one page by the automatic page turning apparatus 3, or more specifically, the time secured for an optimal page turning operation, by the interruption page count M.

When the operation screen G is being displayed, if there is no photographing start instruction that is given by the user touching the photographing start button 201 (NO at Step SA6), and there is no photographing stop instruction that is given by the user touching the photographing stop button 203 (NO at Step SA7), the control section 25 repeats the processing in Step SA2 to Step SA5. When a photographing stop instruction is given (YES at Step SA7), the control section 25 immediately stops the processing in the divisional photographing mode at that point.

At Step SA6, for example, if the user inputs (sets) the photographing page count N and the interruption page count M and then touches the photographing start button 201 (YES at Step SA6) with the tablet 2 being placed on the stand 20 (see FIG. 1), the control section 25 performs the following processing.

First, the control section 25 performs a first photographing operation at this timing by using the imaging section 21, and stores a photographed image in a work area in the storage section 26 (Step SA8). Then, the control section 25 sets "1" as the photographing-completed page count n (Step SA9). Note that the photographing-completed page count n is immediately reflected (displayed) in the operation screen G.

Figure 5:
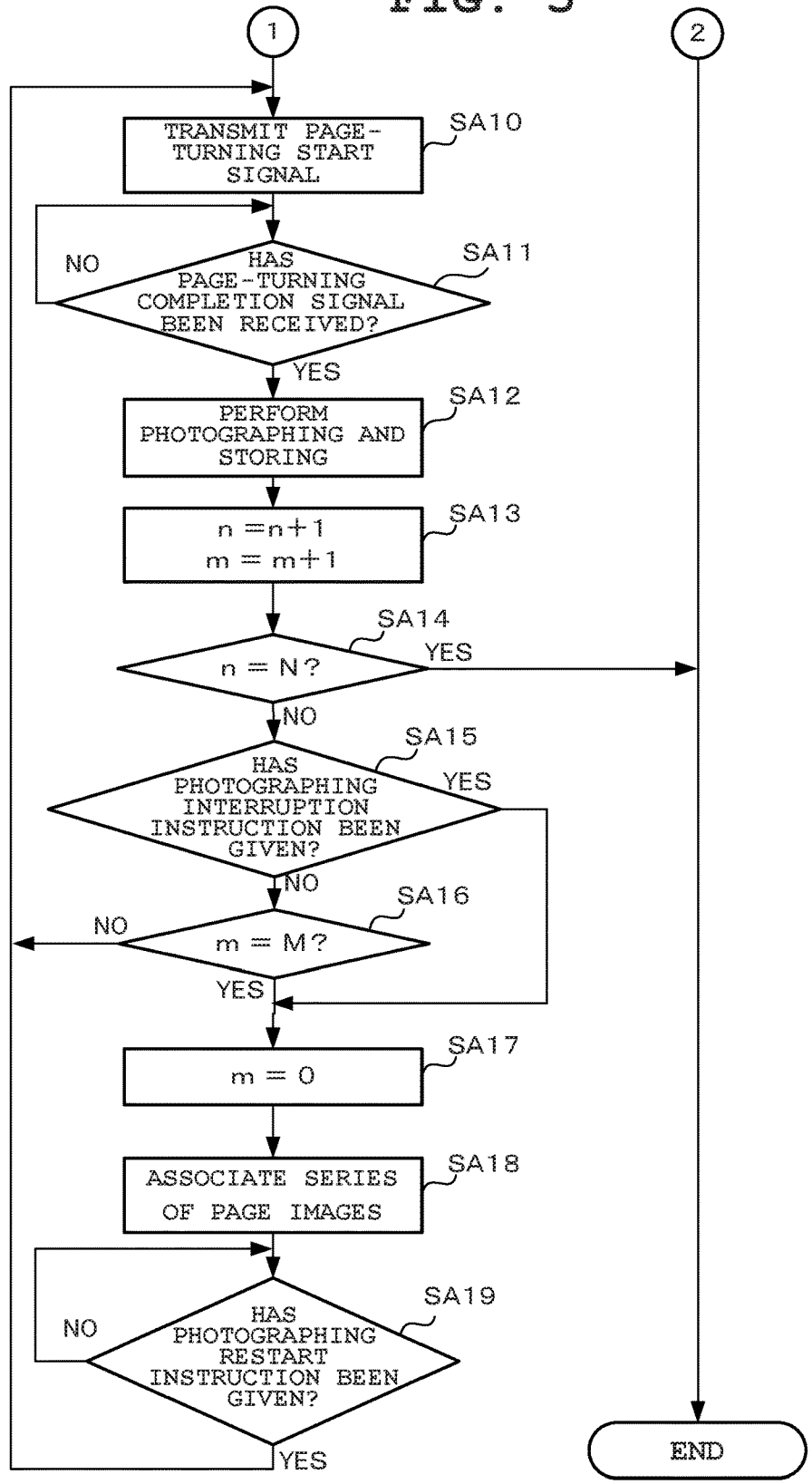
FIG. 5 is a flowchart following that of FIG. 4.

Subsequently, the control section 25 transmits a page-turning start signal to instruct the automatic page turning apparatus 3 to start page turning as shown in FIG. 5 (Step SA10).

Figure 6:
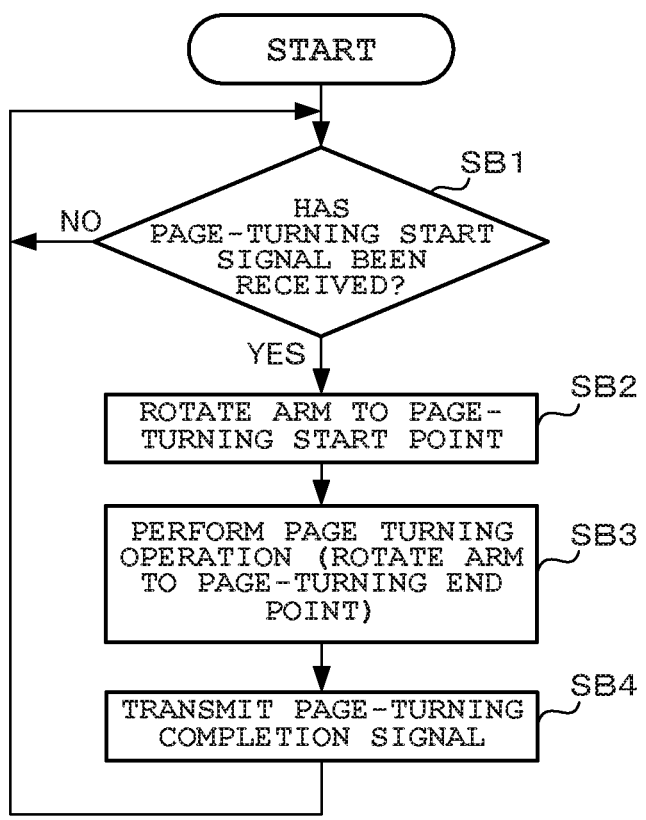
FIG. 6 is a flowchart showing the operation of an automatic page turning apparatus.

As shown in FIG. 6, when the control section 31 receives the page-turning start signal from the tablet 2 via the communication section 35 (YES at Step SB1), the automatic page turning apparatus 3 causes the motor driving circuit section 34 to drive the motor to rotate the arm to the page-turning start point (Step SB2). Subsequently, the control section 31 drives the arm in the opposite direction to rotate it to the page-turning end point, and thereby performs a page turning operation of turning one page P of the book B (Step SB3). Here, by having been activated simultaneously with the power-on of the automatic page turning apparatus 3, the air blowing section 5 is operating in the automatic page turning apparatus 3, so that the pressure of air therefrom prevents the turned page P from returning.

Then, at the timing of the completion of the page turning operation, the control section 31 transmits a page-turning completion signal to the tablet 2 to inform the completion of the page turning operation via the communication section 35 (Step SB4). Subsequently, until the next page-turning start signal is received from the tablet 2, the control section 31 stands by while keeping the arm rotated to the page-turning end point (NO at Step SB1). Hereafter, every time a page-turning start signal is received (YES at Step SB1), the control section 31 repeats the operations of Step SB2 and the following steps.

In the tablet 2, after the start of a page turning operation by the automatic page turning apparatus 3, the control section 25 waits for a page-turning completion signal (Step SA11).

When a turning completion signal is received from the automatic page turning apparatus 3 (YES at Step SA1), the control section 25 performs the second or subsequent photographing operation at this timing and stores the photographed image in the work area of the storage section 26 (Step SA12). Then, the control section 25 increments the photographing-completed page count n and a sequential page-turning count m (Step SA13). Note that, at this time as well, the control section 25 updates the photographing-completed page count n on the operation screen G.

Hereafter, until the photographing-completed page count n reaches the set photographing page count N (NO at Step SA14), the control section 25 keeps on judging whether a photographing interruption instruction (a touching operation on the photographing interruption button 202) has been given by the user. When judged that no photographing interruption signal has been given (NO at Step SA15), the control section 25 judges whether the sequential page-turning count m has reached the interruption page count M set by the user (Step SA16).

When judged that the sequential page-turning count m has not reached the interruption page count M (NO at Step SA16), the control section 25 returns to Step SA10 and repeats the subsequent processing. That is, the control section 25 repeatedly performs processing of causing the automatic page turning apparatus 3 to perform a next page turning operation, performing image photographing with the reception of a page-turning completion signal as a trigger, and incrementing the photographing-completed page count n and the sequential page-turning count m.

During this processing, when the sequential page-turning count m reaches the interruption page count M (YES at Step SA16), the control section 25 initializes the sequential page-turning count m to "0" (Step SA17), and then associates a group of page images (photographed images) stored by the sequential photographing performed up to this point (Step SA18). More specifically, the control section 25 writes the associated information in the management table 260 so as to allow the information to be processed as a group of images in the subsequent editing operation.

Then, the control section 25 stands by until a photographing restart instruction is given by the user by a touching operation on the photographing start button 201 (NO at Step SA19). Then, at the timing of the issuance of a photographing restart instruction (YES at Step SA19), the process returns to Step SA10. As a result, the control section 25 restarts the sequential page-turning operation of the automatic page turning apparatus 3 and the photographing operation for a series of pages in conjunction with the page turning operation, which have been interrupted because the sequential page-turning count m has reached the interruption page count M.

By the above-described processing, every time the number of pages sequentially turned over reaches the interruption page count M set by the user, the sequential page-turning operation of the automatic page turning apparatus 3 is stopped. In addition, a series of photographing operations for left or right pages serving as photographing targets, which are performed in conjunction with the above-described operation, are interrupted, and photographed page images are stored as a group of images for each interruption page count in a processable state.

When repeating the processing of Steps SA10 to SA16, that is, when sequentially photographing pages during a sequential page-turning operation by the automatic page turning apparatus 3, if a photographing interruption instruction given by the user is received at an arbitrary time point (YES at Step SA15), the control section 25 immediately shifts to the processing of Step SA17 even if the page turning count acquired by the sequential page-turning operation has not reached the interruption page count M.

That is, the control section 25 initializes the sequential page-turning count m to "0" and associates a group of page images stored by the sequential photographing performed up to this point (Step SA18). Then, at the timing of the issuance of a photographing restart instruction (YES at Step SA19), the control section 25 returns to Step SA10, and repeats the subsequent processing. Then, when the photographing-completed page count n reaches the photographing page count N during this processing (YES at Step SA14), the control section 25 terminates the processing in the divisional photographing mode at this point.

As described above, in automatic photographing in the divisional photographing mode, every time the sequential page-turning count m reaches the interruption page count M set by the user, the automatic page turning apparatus 3 automatically stops a sequential page turning operation. This allows the user to easily perform a series of page photographing operations by setting, as the interruption page count M, the number of times of page turning which is expected to exceed the limit at which the pressure of air can prevent pages at the page-turning end point from returning (or the number of times of page turning which is equal to or less than the number described above).

That is, a burdensome operation of stopping page turning at suitable timing while checking a page state on the page-turning end point side during a series of page photographing operations is not necessary. This allows the user to continue an automatic photographing operation by only holding a plurality of pages on a page-turning end point side with a clip C as shown in FIG. 1 and giving an instruction to restart a page turning operation when a page turning operation is stopped, which improves workability in photographing a series of pages.

In addition, when the user sets the interruption page count M, the corresponding interruption interval T of a series of page photographing operations, that is, a time interval at which a page turning operation is stopped is displayed. This allows the user to know in advance how frequently the user should perform the above-described holding operation and the issuance of a restart instruction, which improves convenience in addition to workability in photographing a series of pages.

Note that the time required for a page-turning operation for each page in the automatic page turning apparatus 3 is almost constant. Therefore, the user may set the interruption interval T in a series of page photographing operations instead of the interruption page count M. In this case, the stop timing of a page turning operation may be specified by calculating the interruption page count M from the interruption interval T and counting the sequential page-turning count m as in this embodiment or may be specified by directly measuring the time elapsed from the transmission of a turning start signal.

In addition, the user may set arbitrary information different from the interruption page count M or the interruption interval T as interruption information for determining the stop timing of the page turning operation of the automatic page turning apparatus 3. Alternatively, the interruption page count M and the like may be determined in advance instead of being set by the user.

Here, timing at which already turned pages become unstable at the page-turning end point varies depending on the effect of the thickness of the book, the paper thickness of each page, and the like. Therefore, providing a configuration which allows the user to set the interruption page count M and the like as in this embodiment makes it possible to automatically stop a turning operation always at optimal timing. That is, the user can operate the automatic page turning apparatus 3 to reliably and unfailingly perform a page turning operation without unnecessarily shortening time intervals at which a page turning operation is stopped.

By the configuration where the user can set the interruption page count M and the like, the number of times the user holds a plurality of pages at a page-turning end point and gives an instruction to restart a page turning operation can be minimized, which also improves workability in photographing a series of pages.

In addition, by the configuration where an automatically stopped turning operation is restarted at timing at which the user has given an instruction to restart photographing, the user can restart a series of page photographing operations at suitable timing. As a result of this configuration, even during a series of page photographing operations, the user can leave the place where the photographing is being performed, which also improves convenience in addition to workability in photographing a series of pages.

Note that an automatically stopped turning operation may be automatically restarted at timing at which the time elapsed from the stop time point of a turning operation has reached a predetermined waiting time instead of the timing of the issuance of a photographing start instruction by the user. In this case as well, the apparatus may be configured to receive a photographing start instruction from the user and, when a photographing start instruction is received from the user before the time elapsed from the stop time point of a page-turning operation reaches the waiting time, the apparatus may restart the page turning operation at this time point.

Also, the page turning operation of the automatic page turning apparatus 3 is stopped at an arbitrary time point in response to an interruption instruction from the user even if the sequential page-turning count m has not reached the interruption page count M. Accordingly, it is possible to deal with a situation in which a page state on a page-turning end point side has deteriorated against the user's expectation before the sequential page-turning count m reaches the interruption page count M, which also improves convenience in addition to workability in photographing a series of pages.

In the present embodiment, the tablet 2 executes the book management program. However, the present invention is not limited thereto. The function according to the present invention can also be actualized by supplying a program which can actualize the same processing as that actualized by the book management program to other information devices such as a general personal computer. In addition, an arbitrary program supply method can be used. For example, a program may be supplied from a Web page on the Internet to a personal computer or the like.

Also, in the present embodiment, the page turning operation of the automatic page turning apparatus 3 which switches a photographing target by automatically turning each page P of an opened book B from a page-turning start point to a page-turning end point is controlled. However, the present invention can also be applied to an arbitrary page turning apparatus as long as it is designed to mechanically turn over a page as an imaging target.

Arbitrary page turning apparatuses include, for example, a scanner with an automatic feeder which is designed to photograph document surfaces while mechanically feeding a plurality of document pages and continuously switching photographing targets.

In this case, by a configuration where the automatic feeder stop its document feeding operation every time the number of fed pages reaches a predetermined number of pages, that is, by a configuration where the automatic feeder can limit the number of pages to be fed by one feeding operation to a predetermined number of pages, a large number of document pages can be converted into files for each predetermined number of pages. For example, in a case where a single file is generated by captured image data (scan data) being sequentially combined, a large number of document pages can be converted into files for each predetermined number of pages without requiring the adjustment of the number of pages to be set on the automatic feeder, which improves workability in image capturing of a series of pages.

While the present invention has been described with reference to the preferred embodiments, it is intended that the invention be not limited by any of the details of the description therein but includes all the embodiments which fall within the scope of the appended claims.

What is claimed is:

1. An apparatus for controlling page turning, comprising:
an interruption section which repeatedly interrupts a page turning operation of a page turning apparatus, which mechanically turns a page serving as an imaging target, at predetermined equal interruption intervals, wherein the predetermined interruption intervals are predetermined such that a plurality of pages are turned between interruptions of the page turning operation; and
a restarting section which, every time the page turning operation of the page turning apparatus is interrupted, restarts the page turning operation in response to a restart instruction by a user.

2. The apparatus according to claim 1, further comprising:
a processor which functions as the interruption section and the restarting section.

3. The apparatus according to claim 1, further comprising:
a storage section which stores interruption information for determining the interruption intervals,
wherein the interruption section interrupts the page turning operation of the page turning apparatus at the interruption intervals, which are determined based on the interruption information stored in the storage section.

4. The apparatus according to claim 3, further comprising:
a setting section which prompts the user to set the interruption information for determining the interruption intervals,
wherein the storage section stores the interruption information set by the setting section prompting the user.

5. The apparatus according to claim 4, wherein the setting section prompts the user to set, as the interruption information, one of a page count and an interruption interval time period.

6. The apparatus according to claim 4, further comprising:
a display section which displays the interruption information.

7. The apparatus according to claim 1, wherein a specific control mode is provided as a control mode for controlling the page turning apparatus, and wherein the interruption section in the specific control mode interrupts the page turning operation of the page turning apparatus at specified interruption intervals, and the restarting section restarts the page turning operation of the page turning apparatus interrupted by the interruption section.

8. A method for controlling page turning, comprising:

repeatedly interrupting a page turning operation of a page turning apparatus, which mechanically turns a page serving as an imaging target, at predetermined equal interruption intervals, wherein the predetermined interruption intervals are predetermined such that a plurality of pages are turned between interruptions of the page turning operation; and every time the page turning operation of the page turning apparatus is interrupted, restarting the page turning operation in response to a restart instruction by a user.

9. The method according to claim 8, further comprising:

storing interruption information for determining the interruption intervals in a storage section, wherein the interrupting interrupts the page turning operation of the page turning apparatus at the interruption intervals, which are determined based on the interruption information stored in the storage section.

10. The method according to claim 8, further comprising:

prompting the user to set, as interruption information for determining the interruption intervals, one of a page count and an interruption interval time period.

11. The method according to claim 8, wherein a specific control mode is provided as a control mode for controlling the page turning apparatus, and wherein the interrupting interrupts the page turning operation of the page turning apparatus at specified interruption intervals in the specific control mode, and the restarting restarts the page turning operation interrupted in the page turning apparatus.

12. A non-transitory computer-readable storage medium having a program stored thereon that is executable by a computer to actualize functions comprising:

repeatedly interrupting a page turning operation of a page turning apparatus, which mechanically turns a page serving as an imaging target, at predetermined equal interruption intervals, wherein the predetermined interruption intervals are predetermined such that a plurality of pages are turned between interruptions of the page turning operation; and every time the page turning operation of the page turning apparatus is interrupted, restarting the page turning operation in response to a restart instruction by a user.

13. The storage medium according to claim 12, wherein the program further causes the computer to store interruption information for determining the interruption intervals in a storage section, and wherein the interrupting interrupts the page turning operation of the page turning apparatus at the interruption intervals, which are determined based on the interruption information stored in the storage section.

14. The storage medium according to claim 12, wherein the program further causes the computer to prompt the user to set, as interruption information for determining the interruption intervals, one of a page count and an interruption interval time period.

15. The storage medium according to claim 12, wherein the program further causes the computer to provide a specific control mode as a control mode for controlling the page turning apparatus, and wherein the interrupting interrupts the page turning operation of the page turning apparatus at specified interruption intervals in the specific control mode, and the restarting restarts the page turning operation interrupted in the page turning apparatus.

16. An apparatus for controlling page turning, comprising:

a setting section which prompts a user to set a page count as interruption information;

a derivation section which derives an interruption interval of a series of page turning operations of a page turning apparatus, which mechanically turns a page serving as an imaging target, based on the page count set by the user;

an interruption section which interrupts the series of page turning operations of the page turning apparatus, at equal interruption intervals to the interruption interval derived by the derivation section;

a restarting section which, every time the series of page turning operations of the page turning apparatus are interrupted, restarts the series of page turning operations in response to a restart instruction by the user; and a display section which displays the page count and the interruption interval derived by the derivation section.

17. An apparatus for controlling page turning, comprising:

a first interruption section which repeatedly interrupts a series of page turning operations of a page turning apparatus, which mechanically turns a page serving as an imaging target, at a predetermined equal interruption intervals;

a second interruption section which interrupts the series of page turning operations of the page turning apparatus, in response to an interruption instruction given by a user, regardless of the interruption intervals; and a restarting section which restarts the series of page turning operations of the page turning apparatus interrupted by the first interruption section or the second interruption section in response to a restart instruction by the user.

* * * * *